A. G. ADAIR.
SHEEP HOOK.
APPLICATION FILED MAR. 2, 1914.
1,120,115.
Patented Dec. 8, 1914.
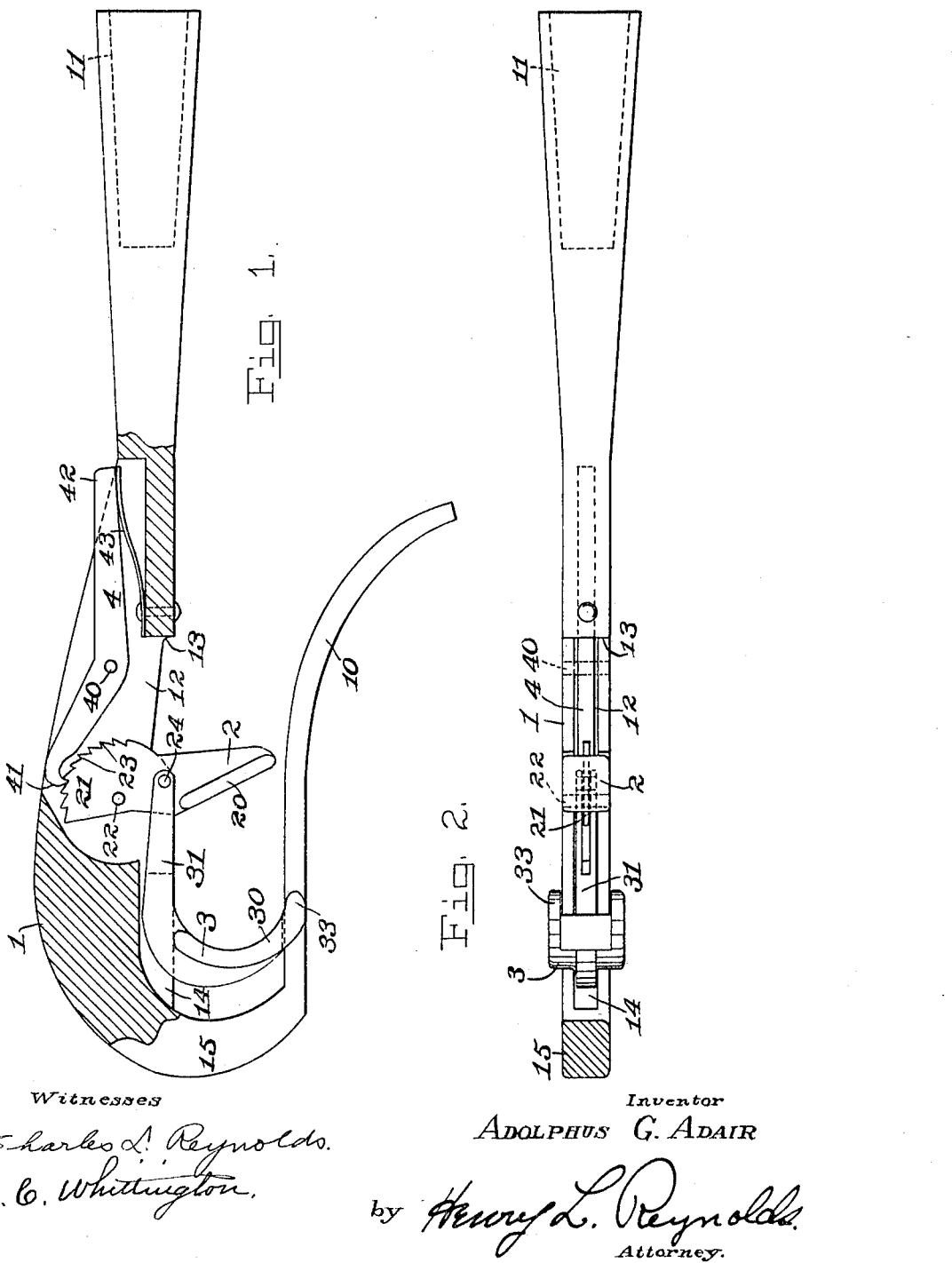
Witnesses
Charles L. Reynolds.
S. C. Whittington.
Inventor
ADOLPHUS G. ADAIR
by Henry L. Reynolds
Attorney.

UNITED STATES PATENT OFFICE.

ADOLPHUS G. ADAIR, OF SEATTLE, WASHINGTON.

SHEEP-HOOK.

1,120,115.   Specification of Letters Patent.   Patented Dec. 8, 1914.

Application filed March 2, 1914. Serial No. 822,057.

*To all whom it may concern:*

Be it known that I, ADOLPHUS G. ADAIR, a citizen of the United States, and resident of Seattle, King county, Washington, have invented certain new and useful Improvements in Sheep-Hooks, of which the following is a specification.

My invention relates to an improvement in sheep hooks, and comprises the novel parts and combinations which will be hereinafter described and particularly pointed out in the claims.

The object of my invention is to provide an effective, simple and cheap construction, by which the gap or mouth of the hook will be automatically closed by the entry of the sheep's leg, thereby insuring a more effective holding of the animal.

In the accompanying drawings I have shown my invention in its present preferred form.

Figure 1 is a side plan of my invention, with a part of the shank side of the hook broken away to show the peculiar construction. Fig. 2 is a view taken at right angles to that of Fig. 1, with the outer or guard side of the hook removed by a section through the throat.

Upon the shank side 1 of the hook I pivot a gap-closing member 2, which, when the hook is set in position for catching a sheep, lies alongside the shank, and thus does not in any way affect the opening of the hook. The manner of constructing these parts which I prefer consists in providing the shank side of the hook with a central slot 12 which lies in the main plane of the hook, and in this pivoting a flat portion 21 of the gap-closing member, as by pin 22. The projecting end of the gap-closing member is preferably widened, as by flanges 20, so as to provide a broader surface for engagement of the leg. Whereas I generally prefer to do, the device is to be provided with means for locking this gap-closing member in position where it extends across the hook, I provide the flat pivoted end 21 with teeth 23 which will be engaged by the toothed end 41 of a pawl or locking lever 4, which lies in the slot 12, and is pivoted by pin 40. The end 42 of this pawl lever normally projects slightly from the shank so that it may be pressed inward, to thus free the gap-closing member 2. It is normally held in locking position by a spring 43.

In conjunction with the gap-closing member I employ a leg-stop member 3. This has a relatively broad surface 30 which extends across the gap in the hook, and a shank 31 which is pivoted by pin 24 to the gap-closing member. This leg-stop member lies inward of the gap-closing member, or nearer to the bottom line 15 of the hook. This leg-stop member at all times projects across the throat of the hook. With the gap-closing member thrown back or in position where the flanges 20 thereof lie within the recess 13 of the shank, a sheep's leg is free to enter the hook until it contacts with the stop 30, whereupon pressure against the stop 30 will swing the gap-closing member outward or into the position shown in Fig. 1. The pawl 4, being held in contact with the teeth 23, the gap-closing member will be held against return until manually released by pressure upon the upper end of the pawl at 42. To accommodate the shank 31 of the stop member, a continuation 14 of the slot in the shank is provided. The outer end of the stop member is to be supported upon the outer or guard side 10 of the hook. The preferred manner of doing this is to provide this end with ears 33, which embrace the sides of the arm 10, and thus securely support the outer end of the stop member. Attention is called to the fact that the pull of the animal against the hook is resisted entirely by the stop member 3, and not by the hook proper. This draws the gap-closing member down until the animal is gripped between the two as it would be gripped by the thumb and finger. To release the animal it is only necessary to press down the end 42 of the pawl and push the hook forward.

What I claim as my invention and desire to patent is:

1. The combination with a sheep hook of a hook-closing lever pivoted to one side of the hook well within its throat to swing from a position extending outward along the shank to one extending across the throat of the hook, a leg-stop member held to move lengthwise the hook and extending across the hook opening inward from said lever and having actuating connection with the said lever between its pivot and its hook closing end and means for retaining said parts in holding position.

2. The combination with a sheep hook having an extended and outwardly flaring tip, of a hook closing lever pivoted to one side of the hook a short distance from its bend and adapted to swing from a position extending outwardly along the shank to a position extending across the throat, and a leg-stop member having a shank pivoted to said lever outwardly from its pivot and extending thence toward the bend of the hook and then laterally across the hook opening and means for preventing said parts from returning to open position.

3. The combination with a sheep hook having an extended and outwardly flaring tip, of a hook closing lever pivoted to one side of the hook a short distance from its bend and adapted to swing from a position extending outwardly along the shank to a position extending across the throat, and a leg-stop member having a shank pivoted to said lever outwardly from its pivot and extending thence toward the bend of the hook and then laterally across the hook opening, said leg-stop member having guiding engagement with the hook preventing lateral displacement and means engaging said parts to retain them in holding position.

4. The combination with a sheep hook having an extended and outwardly flaring tip, of a hook closing lever pivoted to one side of the hook a short distance from its bend and adapted to swing from a position extending outwardly and along the shank to a position extending across the throat, and a leg-stop member having a shank pivoted to said lever outwardly from its pivot and extending thence toward the bend of the hook and then laterally across the hook opening, the shank of said leg-stop member having sliding engagement with the shank side of the hook and its tip having sliding engagement with the other side of the hook and a catch engaging to retain said parts in holding position.

5. The combination with a sheep hook of a hook-closing lever pivoted to one side of the hook well within its throat to swing from a position extending outward along the shank to one extending across the throat of the hook, a leg-stop member held to move lengthwise the hook and extending across the hook opening inward from said lever and having actuating connection with the said lever between its pivot and its hook closing end, and a catch automatically acting to hold said parts in leg-holding positions.

6. The combination with a sheep hook of a hook-closing lever pivoted to one side of the hook well within its throat to swing from a position extending outward along the shank to one extending across the throat of the hook, a leg-stop member held to move lengthwise the hook and extending across the hook opening inward from said lever and having actuating connection with the said lever between its pivot and its hook closing end, and a pivoted spring held lever engaging the hook closing lever to prevent return to the open position and having an end manually engageable for releasing the hook-closing lever.

7. The combination in a sheep hook of the hook member comprising shank and tip sides connected at one end by a bend, the tip extending for some distance back along the shank and then curving outwardly therefrom to form a wide entrance, a gap-closing lever pivoted to the shank side of the hook opposite the outer part of the parallel part of the tip side of the hook, to swing across the throat and outward to lie along the shank, a leg-stop member of an L-shape having the end of its stem pivoted to the gap-closing member outward from its pivot, the stem of said leg-stop member lying along the shank side of the hook inward from the gap-closing member and with its base extending across the hook opening outward of the curve joining the shank and tip side of the hook and a catch engaging to retain said parts in holding position.

8. The combination in a sheep hook of the hook member comprising shank and tip sides connected at one end by a bend, the tip extending for some distance back along the shank and then curving outwardly therefrom to form a wide entrance, a gap-closing lever pivoted to the shank side of the hook opposite the outer part of the parallel part of the tip side of the hook, to swing across the throat and outward to lie along the shank, a leg-stop member of an L-shape having the end of its stem pivoted to the gap-closing member outward from its pivot, the stem of said leg-stop member lying along the shank side of the hook inward from the gap-closing member and with its base extending across the hook opening outward of the curve joining the shank and tip side of the hook, said leg-stop member having guiding engagement with both sides of the hook and means for holding said parts in closed position.

9. In a sheep hook, a hook having a slot extending through its central plane adjacent the outer part of its throat, a gap-closing lever pivoted in said slot to swing from a position extending outward along the shank to a position extending across and closing the throat of the hook, the pivot end of said lever having ratchet teeth, a catch lever pivoted in the slot in the shank of the hook and engaging the teeth on said gap-closing lever, a leg-stop member having a shank pivoted to the gap-closing lever outward from its pivot and extending alongside of and having guiding engagement with the shank side of the hook and a lateral leg-engaging extension extending across the hook opening outwardly of the connecting bend and having guiding engagement with the other side of the hook.

10. The combination with a sheep hook having the shank side of the hook slotted lengthwise and in the plane of the hook, a gap-closing lever pivoted in said slot, and a leg-stop member lying inward from the gap-closing lever and having a shank pivotally connecting it with the gap-closing lever, the outer end of said leg-stop member being bifurcated and spanning the outer arm of the hook and means for retaining said parts in holding position.

In testimony whereof I have hereunto affixed my signature this 21st day of February, 1914.

A. G. ADAIR.

Witnesses:
HENRY L. REYNOLDS,
I. W. MASON,
W. H. ROBERTSON.

Copies of this patent may be obtained for five cents each, by addressing the "Commissioner of Patents, Washington, D. C."